(12) United States Patent
Chang et al.

(10) Patent No.: US 7,856,883 B2
(45) Date of Patent: Dec. 28, 2010

(54) CAPACITIVE ULTRASONIC SENSORS AND DISPLAY DEVICES USING THE SAME

(75) Inventors: Ming-Wei Chang, Taiping (TW);
Hsu-Cheng Deng, Hsinchu (TW);
Tsung-Ju Gwo, Banciao (TW)

(73) Assignee: Industrial Technology Research Institute, Hsinchu (TW)

( * ) Notice: Subject to any disclaimer, the term of this patent is extended or adjusted under 35 U.S.C. 154(b) by 452 days.

(21) Appl. No.: 12/054,302

(22) Filed: Mar. 24, 2008

(65) Prior Publication Data
US 2009/0235750 A1  Sep. 24, 2009

(51) Int. Cl.
*G01B 17/00* (2006.01)
(52) U.S. Cl. .......................................... 73/627; 73/598
(58) Field of Classification Search .................... 73/627, 73/598, 600, 618, 620; 600/459
See application file for complete search history.

(56) References Cited

U.S. PATENT DOCUMENTS

| | | | | |
|---|---|---|---|---|
| 5,702,123 | A * | 12/1997 | Takahashi et al. | 280/735 |
| 6,341,252 | B1 * | 1/2002 | Foo et al. | 701/45 |
| 6,440,073 | B1 * | 8/2002 | Robinson et al. | 600/437 |
| 2004/0027327 | A1 | 2/2004 | LeCain et al. | |
| 2007/0013266 | A1 | 1/2007 | Chang et al. | |
| 2008/0086056 | A1 | 4/2008 | Chang et al. | |
| 2008/0122798 | A1 * | 5/2008 | Koshiyama et al. | 345/173 |
| 2008/0188753 | A1 | 8/2008 | Chang et al. | |
| 2008/0202243 | A1 * | 8/2008 | Gross | 73/627 |
| 2009/0167725 | A1 * | 7/2009 | Lee et al. | 345/178 |

FOREIGN PATENT DOCUMENTS

JP 03096890 * 4/1991

* cited by examiner

*Primary Examiner*—J M Saint Surin
(74) *Attorney, Agent, or Firm*—Alston & Bird LLP (57) ABSTRACT

A capacitive ultrasonic device is capable of detecting an object and providing information regarding an orientation of the object. The capacitive ultrasonic device includes a power source configured to generate a voltage signal, an array of sensor elements, each of the sensor elements being configured to generate an ultrasonic wave during a first period of the voltage signal and detect whether a wave is reflected from the object during a second period of the voltage signal when the voltage signal is applied thereto, and a control unit configured to activate a first portion of the array of sensor elements through the power source, and activate a second portion of the array of sensor elements when at least one of the first portion of the sensor elements detects a wave reflected from the object.

26 Claims, 8 Drawing Sheets

CAPACITIVE ULTRASONIC SENSORS AND DISPLAY DEVICES USING THE SAME

CROSS-REFERENCE TO RELATED APPLICATIONS

This application contains subject matter related to the subject matters of the following applications, each of which is assigned to the same assignee as this application. The commonly assigned applications include U.S. patent application Ser. No. 11/212,611 ("the '611 application"), entitled "Method of Fabricating a Polymer-Based Capacitive Ultrasonic Transducer," filed Aug. 29, 2005, U.S. patent application Ser. No. 11/703,910 ("the '910 application"), entitled "Flexible Capacitive Ultrasonic Transducer and Method of Fabricating the Same," filed Feb. 7, 2007, and U.S. patent application Ser. No. 11/870,396 ("the '396 application"), entitled "Micro Ultrasonic Transducers," filed Oct. 10, 2007, which is a continuation-in-part of U.S. patent application Ser. No. 10/648,495, filed Aug. 25, 2003, now abandoned.

BACKGROUND OF THE INVENTION

The present invention relates to capacitive ultrasonic transducers and, more particularly, to capacitive ultrasonic sensors and display devices using the capacitive ultrasonic sensors.

With the rapid development in the industry of display devices, touch panels such as pen tablets have been widely applicable to personal digital assistants (PDAs), personal computers (PCs) and other electrical appliances. Generally, a touch panel may include one of a resistor-type, capacitor-type, surface acoustic wave type and infrared refractive type writing panel. Such touch panels in operation may require a direct touch thereon or may allow signal input at a relatively small distance therefrom, for example, hundreds of micrometers. These touch panels thus may not be user-friendly. Furthermore, scratches or slurs resulting from an inappropriate force applied to the panel or a polluted input source may deteriorate the display quality of the panel. Moreover, the touch panels may only support signal input at a two-dimensional (2D) plane, which may inappropriately limit the signal flexibility. Accordingly, non-touch panels that may allow a user to operate at a given distance without touching the panel have been developed. However, some non-touch panels may be disadvantageous in that the distance may be fixed and not flexible. Furthermore, some non-touch panels may be liable to background light and may suffer from relatively low response speed.

It may therefore be desirable to have a panel that is able to allow signal input at a relatively large distance. It may also be desirable to have a panel that is able to detect signal input at a 2D plane and the distance of the signal from the 2D plane, thereby providing information on a three-dimensional (3D) orientation of the signal, including the 2D location related to the signal and the distance of the signal from the panel.

BRIEF SUMMARY OF THE INVENTION

Examples of the present invention may provide a capacitive ultrasonic device capable of detecting an object and providing information regarding an orientation of the object, the capacitive ultrasonic device comprising a power source configured to generate a voltage signal, an array of sensor elements, each of the sensor elements being configured to generate an ultrasonic wave during a first period of the voltage signal and detect whether a wave is reflected from the object during a second period of the voltage signal when the voltage signal is applied thereto, and a control unit configured to activate a first portion of the array of sensor elements through the power source, and activate a second portion of the array of sensor elements when at least one of the first portion of the sensor elements detects a wave reflected from the object.

Some examples of the present invention may also provide a capacitive ultrasonic device capable of detecting an object and providing information regarding an orientation of the object, the capacitive ultrasonic device comprising a power source configured to generate a voltage signal including a direct-current (DC) component, an array of sensor elements coupled to the power source, each of the sensor elements being configured to generate an ultrasonic wave with an effective distance when the voltage signal is applied thereto, and a control unit configured to activate at least one of the array of sensor elements through the power source, and change the effective distance of the ultrasonic wave by changing the magnitude of the DC component of the voltage signal.

Examples of the present invention may further provide a capacitive ultrasonic device capable of detecting an object and providing information regarding an orientation of the object, the capacitive ultrasonic device comprising a power source configured to generate a voltage signal including a direct-current (DC) component, a capacitive ultrasonic sensor coupled to the power source, the capacitive ultrasonic sensor including an array of sensor elements each of which is configured to generate an ultrasonic wave with an effective distance when the voltage signal is applied thereto, and a control unit configured to identify a position of each of the sensor elements and a distance between the each of the sensor elements and the object if the each of the sensor elements detects a wave reflected from the object.

Other objects, advantages and novel features of the present invention will be drawn from the following detailed embodiments of the present invention with attached drawings, in which:

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Figure 1A:
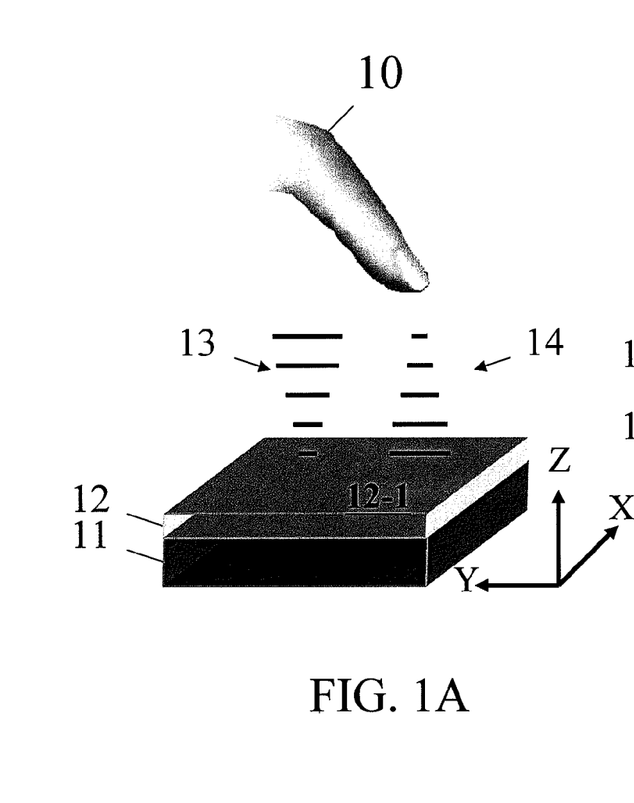
FIG. 1A is a schematic diagram of a capacitive ultrasonic sensor in accordance with an example of the present invention.

FIG. 1A is a schematic diagram of a capacitive ultrasonic sensor 12 in accordance with an example of the present invention. Referring to FIG. 1A, the capacitive ultrasonic sensor 12 may transmit ultrasonic waves 13 and receive reflected waves 14 reflected from an object 10. The capacitive ultrasonic sensor 12 may include a transparent membrane on which a plurality of sensor elements are formed. The capacitive ultrasonic sensor 12 may detect the movement of the object 10 based on the reflected waves 14 when the object 10 moves over the capacitive ultrasonic sensor 12 across a surface 12-1 thereof. Specifically, the capacitive ultrasonic sensor 12 may detect an orientation of the object 12, including a two-dimensional (2D) location of the object 12 represented by the sensor elements that detect the object 12 and the distance of the object 12 from the capacitive ultrasonic sensor 12. The capacitive ultrasonic sensor 12 may be disposed between a display panel 11 and the object 10. In the present example, the capacitive ultrasonic sensor 12 may be attached to the display panel 11. In other examples, however, the capacitive ultrasonic sensor 12 may be slightly separated from the display panel 11 by, for example, less than approximately 0.2 millimeters.

FIG. 1A is a schematic diagram of a capacitive ultrasonic sensor 12 in accordance with an example of the present invention. Referring to FIG. 1A, the capacitive ultrasonic sensor 12 may transmit ultrasonic waves 13 and receive reflected waves 14 reflected from an object 10. The capacitive ultrasonic sensor 12 may include a transparent membrane on which a plurality of sensor elements are formed. The capacitive ultrasonic sensor 12 may detect the movement of the object 10 based on the reflected waves 14 when the object 10 moves over the capacitive ultrasonic sensor 12 across a surface 12-1 thereof. Specifically, the capacitive ultrasonic sensor 12 may detect an orientation of the object 12, including a two-dimensional (2D) location of the object 12 represented by the sensor elements that detect the object 12 and the distance of the object 12 from the capacitive ultrasonic sensor 12. The capacitive ultrasonic sensor 12 may be disposed between a display panel 11 and the object 10. In the present example, the capacitive ultrasonic sensor 12 may be attached to the display panel 11. In other examples, however, the capacitive ultrasonic sensor 12 may be slightly separated from the display panel 11.

Figure 1B:
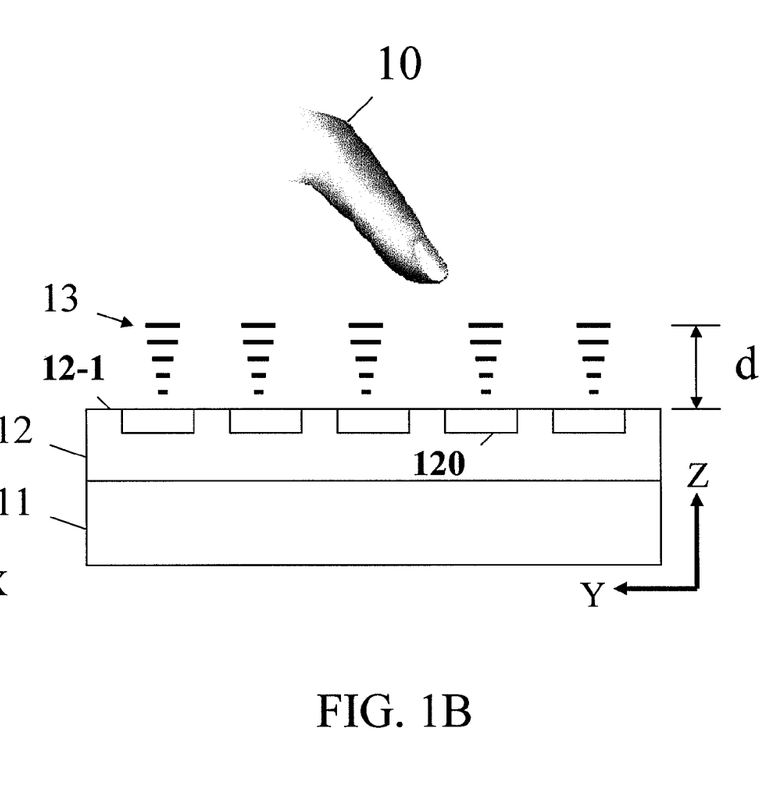
FIG. 1B is a cross-sectional view of the capacitive ultrasonic sensor illustrated in FIG. 1A.

FIG. 1B is a cross-sectional view of the capacitive ultrasonic sensor 12 illustrated in FIG. 1A. Referring to FIG. 1B, the capacitive ultrasonic sensor 12 may include a plurality of sensor elements 120, which may be arranged in an array on, for example, an X-Y plane. Each of the sensor elements 120 may include an ultrasonic transducer capable of transmitting an ultrasonic wave 13 with an effective distance "d", which ensures that reflected waves from the object 10 remote from the surface 12-1 may be detected by the capacitive ultrasonic sensor 12.

Figure 1C:
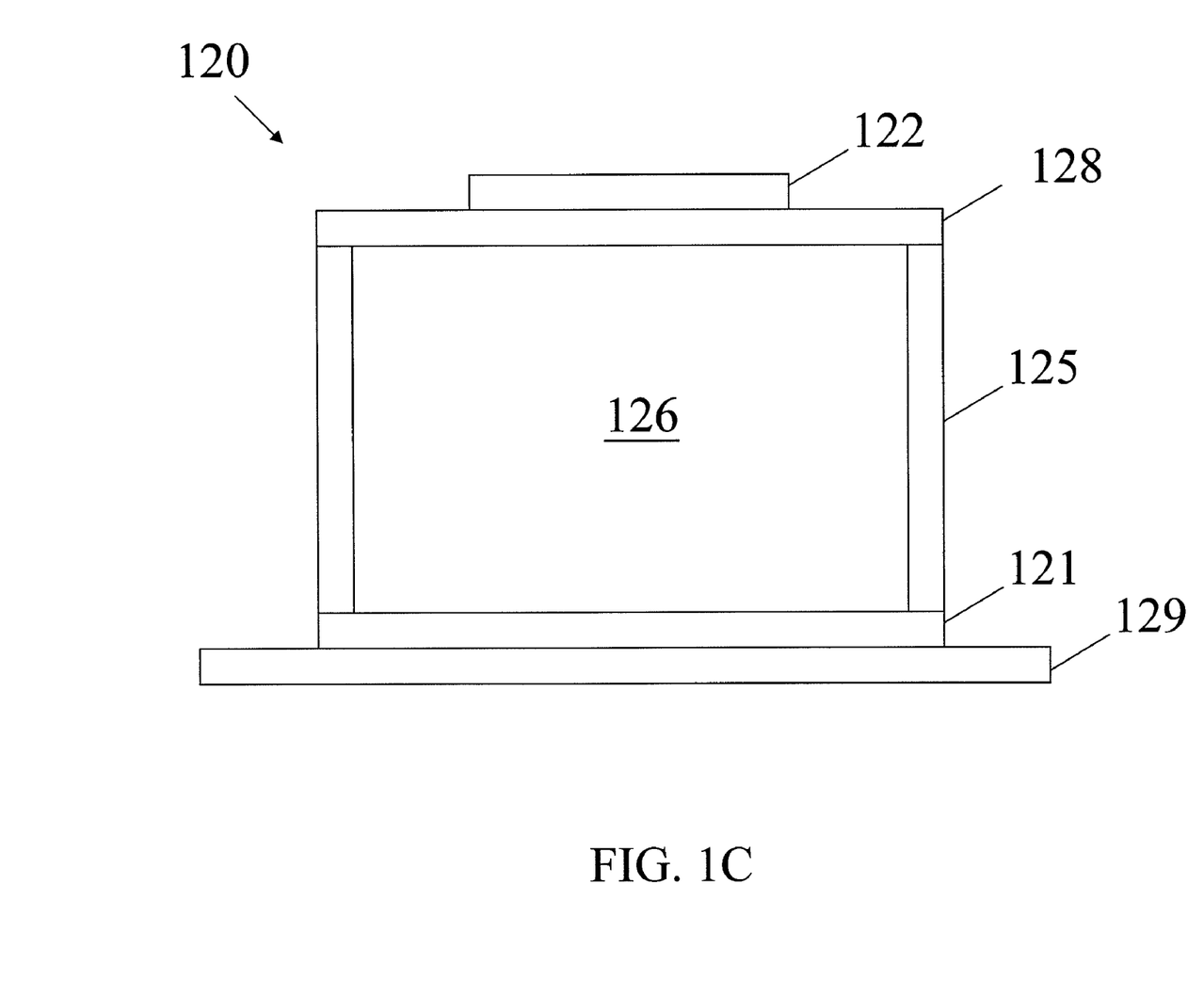
FIG. 1C is a schematic cross-sectional view of one of sensor elements illustrated in FIG. 1B.

FIG. 1C is a schematic cross-sectional view of one of the sensor elements 120 illustrated in FIG. 1B. Referring to FIG. 1C, the sensor element 120, which may take the form of a capacitive ultrasonic transducer, may include a flexible base 129, a first electrode 121, a support frame 125, an oscillating film 128 and a second electrode 122. The flexible base 129 may be made of a material such as, for example, polymer or other suitable material that may allow the sensor element 120 to conform to a surface of an object. The first electrode 121 and the second electrode 122 may serve as a positive electrode and a negative electrode, respectively, for the sensor element 120. The support frame 125 and the oscillating film 128 may be made of polymer. A chamber 126 may be defined by the first electrode 121, the support frame 125 and the oscillating film 128. Examples of capacitive ultrasonic transducers similar to the sensor elements 120 and methods of fabricating capacitive ultrasonic transducers similar to the sensor elements 120 may be found, for example, in the above-mentioned '611, '910 and '396 applications but are not limited thereto. Furthermore, unlike the fixed operable distance in some non-touch panels, the distance "d" according to the present invention may be allowed to change, which will be further described in the following paragraphs by reference to FIGS. 3A and 3B.

Referring back to FIG. 1B, in one example, the display panel 11 may include a flexible panel such as an electronic paper (e-paper) display or an organic light-emitting diode (OLED) display. In that case, the capacitive ultrasonic sensor 12 may include a transparent, flexible substrate made of, for example, polymeric material, and an array of transparent, flexible ultrasonic transducers. Examples of the transparent, flexible ultrasonic transducers may be found in the above-mentioned '910 and '396 applications but are not limited thereto.

In another example, the display panel 11 may include a rigid panel such as a liquid crystal display (LCD) panel. In that case, the capacitive ultrasonic sensor 12 may include a transparent, non-flexible substrate such as a glass substrate and an array of transparent, non-flexible ultrasonic transducers. Examples of non-flexible ultrasonic transducers may be found in the above-mentioned '611 application but are not limited thereto.

Figure 2A:
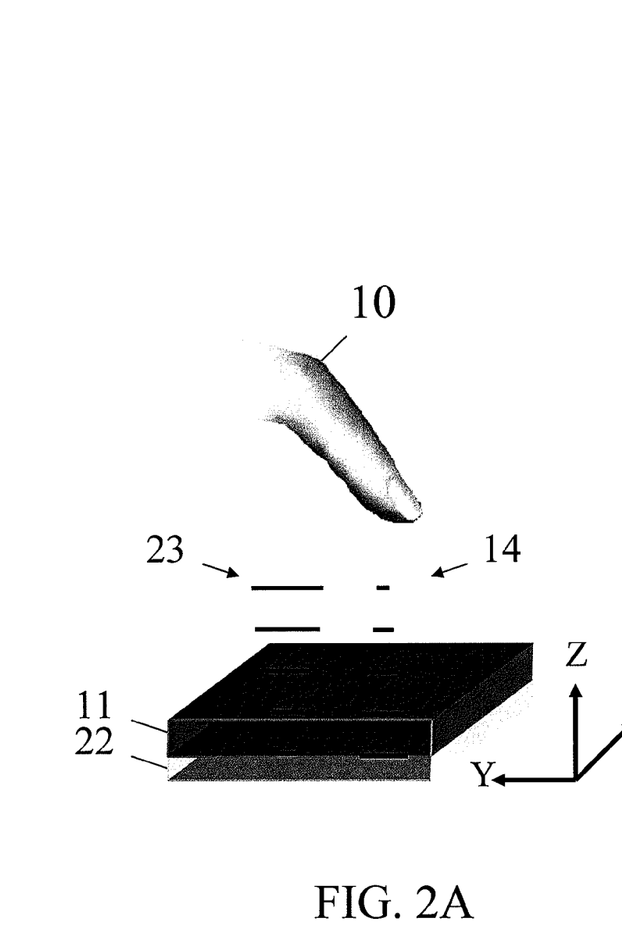
FIG. 2A is a schematic diagram of a capacitive ultrasonic sensor in accordance with another example of the present invention.

FIG. 2A is a schematic diagram of a capacitive ultrasonic sensor 22 in accordance with another example of the present invention. Referring to FIG. 2A, the capacitive ultrasonic sensor 22 may be similar to the capacitive ultrasonic sensor 12 described and illustrated with reference to FIGS. 1A and 1B except that, for example, the capacitive ultrasonic sensor 22 may transmit ultrasonic waves 23 toward the object 10 through the display panel 11. That is, the display panel 11 may be disposed between the capacitive ultrasonic sensor 22 and the object 10.

Figure 2B:
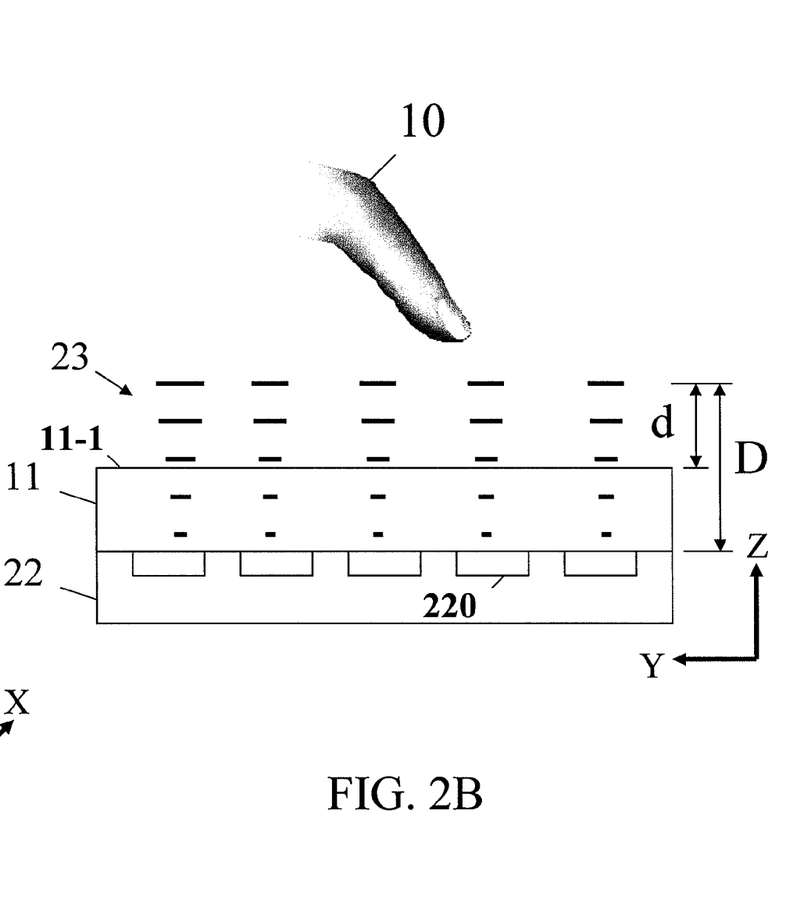
FIG. 2B is a cross-sectional view of the capacitive ultrasonic sensor illustrated in FIG. 2A.

FIG. 2B is a cross-sectional view of the capacitive ultrasonic sensor 22 illustrated in FIG. 2A. Referring to FIG. 2B, the capacitive ultrasonic sensor 22 may include an array of ultrasonic transducers 220 similar to the array of ultrasonic transducers 120 described and illustrated with reference to FIG. 1B except that, for example, the ultrasonic transducers 220 may transmit the ultrasonic waves 23 with a radio coverage "D" so as to attain the effective distance "d" between the object 10 and a surface 11-1 of the display panel 11.

Figure 3A:
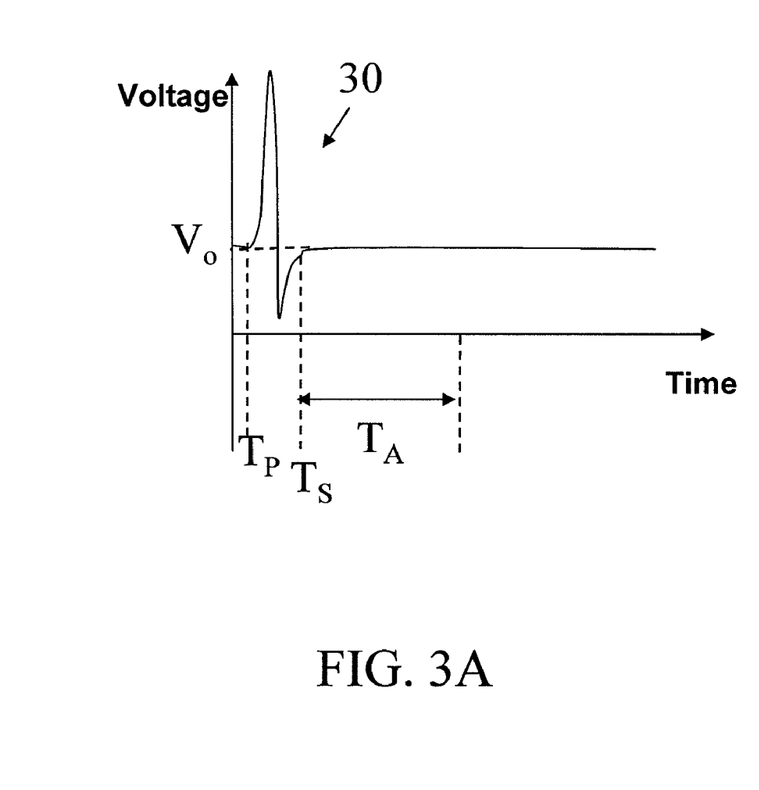
FIG. 3A is a pulse diagram of an exemplary voltage signal provided to a sensor element.

FIG. 3A is a pulse diagram of an exemplary voltage signal 30 provided to a sensor element. The sensor element may include one of the sensor elements 120 and 220 described and illustrated with reference to FIGS. 1B and 2B, respectively. Referring to FIG. 3A, the voltage signal 30 may include an alternating-current (AC) component and a direct-current (DC) component during a first period from $T_P$ to $T_S$ and may include only the DC component with the AC component being removed during a second period $T_A$ after $T_S$. With the voltage signal 30, the sensor elements 120 and 220 may be configured to operate at a transmitting state during the first period for generating ultrasonic waves, and operate at a sensing state during the second period for sensing at least one reflected wave, if any. The AC and DC components applied to at least a portion of the sensor elements during the first period may cause each of the portion of sensor elements to vibrate and generate an ultrasonic wave. Once the ultrasonic wave is transmitted, during the second period with the AC component removed, the DC component may keep the portion of sensor elements active so as to detect a reflected signal, if any. The DC component may have a voltage level of $V_0$.

Figure 3B:
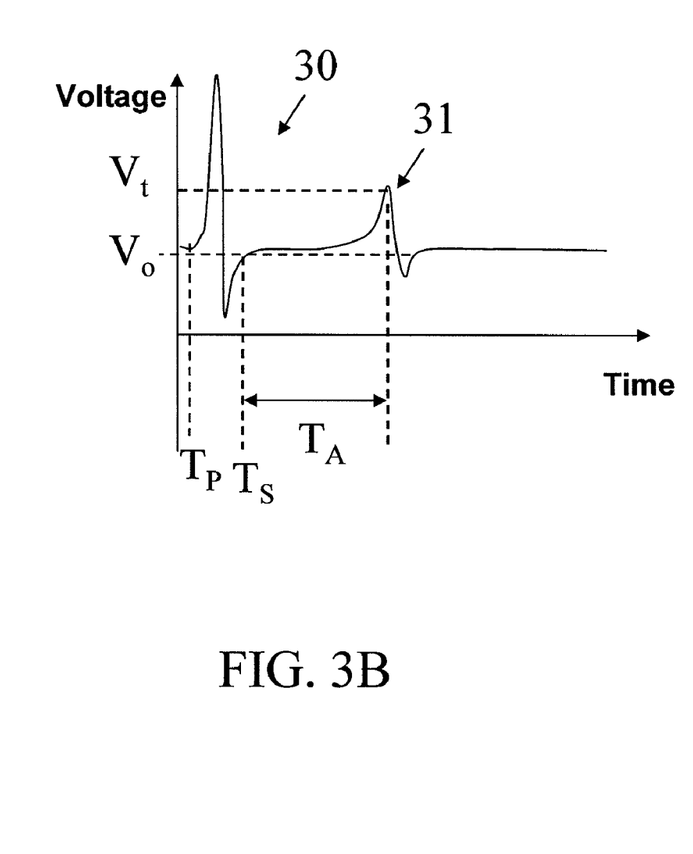
FIG. 3B is a pulse diagram of an exemplary reflected signal received by a sensor element.

FIG. 3B is a pulse diagram of an exemplary reflected signal 31 received by a sensor element. Referring to FIG. 3B, during the second period, the reflected signal 31 due to a reflected ultrasonic wave such as the reflected ultrasonic wave 14 illustrated in FIG. 1A or 2A may be received by the sensor element. In one example, a reflected signal from an object may be detected by the sensor element when the amplitude of the reflected signal is greater than or equal to a threshold Vt. That is, signals reflected from the object with a voltage level smaller than the threshold Vt may be insignificant and thus may not be treated as real reflected signals or may be neglected by the sensor element. After the second period, another voltage pulse similar to the voltage signal 30 may be provided to the sensor element to initiate another detection cycle including another first period and second period.

FIG. 3B is a pulse diagram of an exemplary reflected signal 31 received by a sensor element. Referring to FIG. 3B, during the second period, the reflected signal 31 due to a reflected ultrasonic wave such as the reflected ultrasonic wave 14 illustrated in FIG. 1A or 2A may be received by the sensor element. In one example, a reflected signal from an object may be detected by the sensor element when the amplitude of the reflected signal is greater than or equal to a threshold Vt. That is, signals reflected from the object with a voltage level smaller than the threshold Vt may be insignificant and thus may not be treated as real reflected signals or may be neglected by the sensor element. After the second period, another voltage pulse similar to the voltage signal 30 may be provided to the sensor element to initiate another detection cycle including another first period and second period.

Figure 3C:
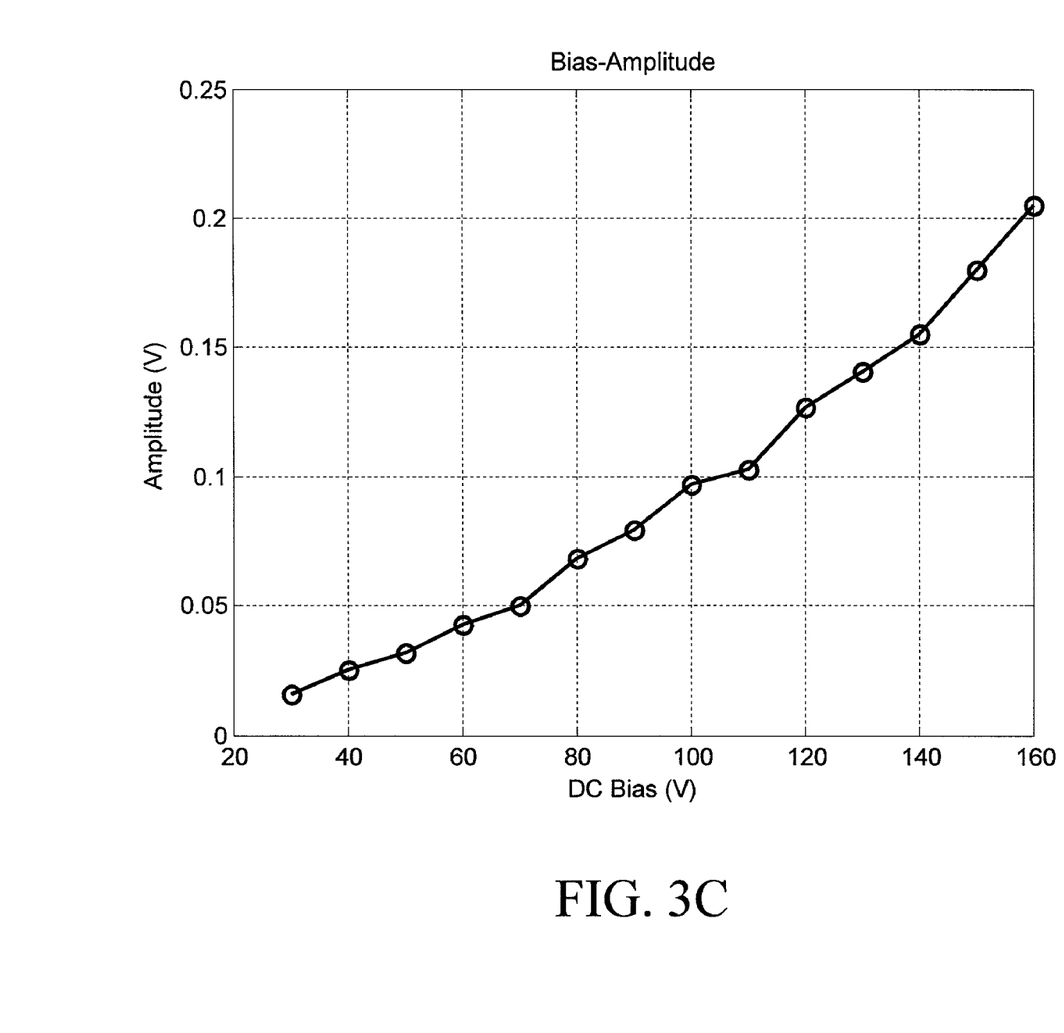
FIG. 3C is a plot illustrating the magnitude of ultrasonic waves at various direct-current (DC) levels.

FIG. 3C is a plot illustrating the magnitude of ultrasonic waves at various direct-current (DC) levels. The effective distance "d" described and illustrated with reference to FIG. 1B may depend on the DC level of the voltage signal 30. Referring to FIG. 3C, an ultrasonic wave generated by each of the sensor elements 120 may have a magnitude of approximately 0.1 volt (V) read from, for example, an oscilloscope, when the DC voltage level of the applied voltage signal 30 is approximately 100V, and may have a magnitude of approximately 0.2V when the DC voltage level of the applied voltage signal 30 is approximately 160V. That is, an increase in the DC level of the applied voltage signal 30 may result in an increase in the amplitude of an ultrasonic wave generated by each of the sensor elements, which in turn may increase an acoustic pressure from the each sensor element. Consequently, the effective distance "d" may increase as the acoustic pressure increases. In one example, the effective distance "d" may range from approximately one (1) centimeter to three (3) centimeters depending on applied voltage levels, which achieves a remarkable improvement as compared to some conventional techniques with an effective distance of hundreds of micrometers, i.e., hundredths of centimeters. Furthermore, the effective range "d" may be changed by changing an applied voltage level to suit different applications.

Figure 4:
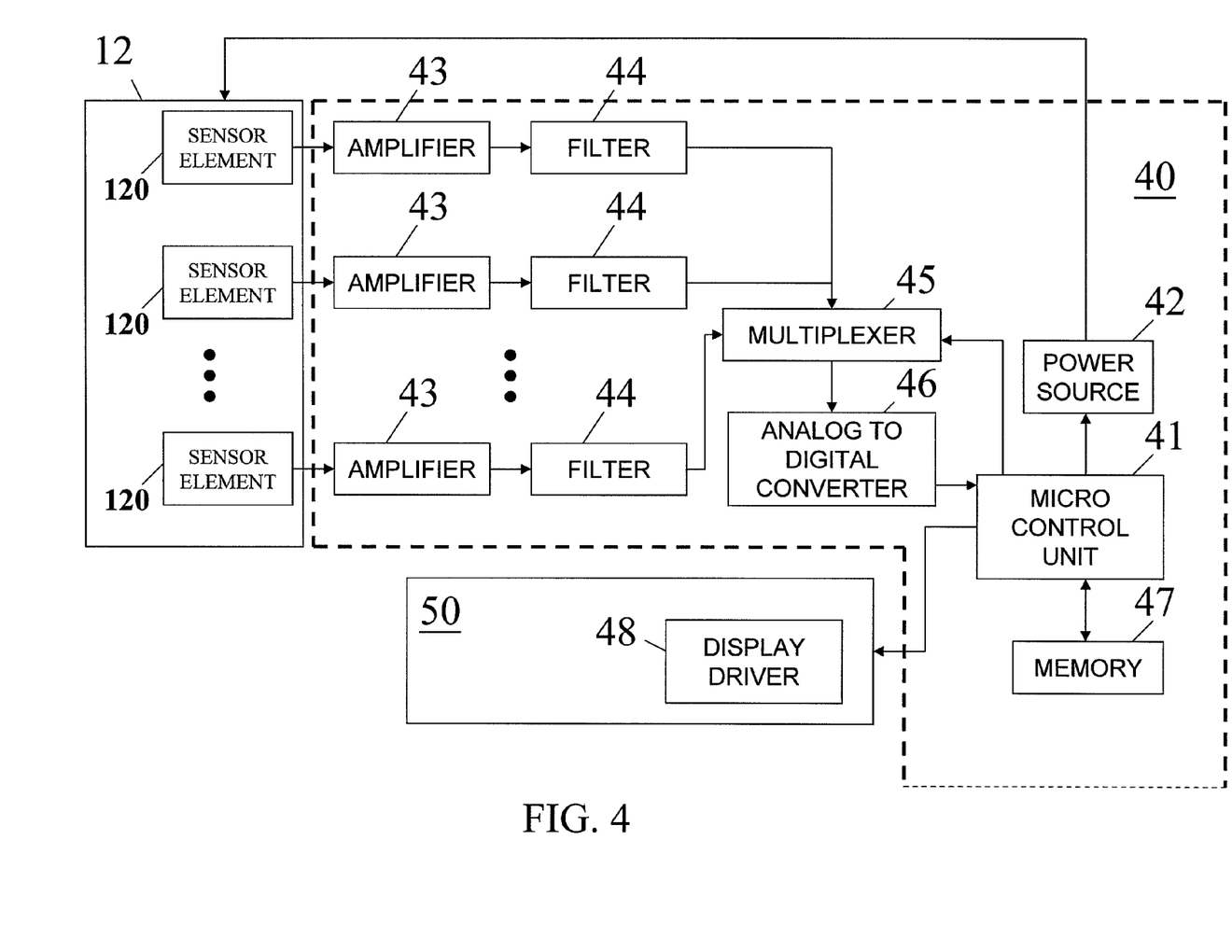
FIG. 4 is a block diagram of a capacitive ultrasonic device in accordance with an example of the present invention.

FIG. 4 is a block diagram of a capacitive ultrasonic device in accordance with an example of the present invention. Referring to FIG. 4, the capacitive ultrasonic device may include a processing module 40 and the capacitive ultrasonic sensor 12. The processing module 40 may be configured to control supplying power to at least a portion of the array of sensor elements 120 in the capacitive ultrasonic sensor 12, process signals from the capacitive ultrasonic sensor 12 and provide signals to a display panel 50. Furthermore, the processing module 40 may include a micro control unit (MCU) 41, a power source 42, amplifiers 43, filters 44, a multiplexer 45 and an analog-to-digital converter (ADC) 46. The power source 42, under the control of the MCU 41, may provide a voltage signal such as the voltage signal 30 described and illustrated with reference to FIG. 3A to at least a portion of the capacitive ultrasonic sensor 12. A reflected signal detected by one of the sensor elements 120 of the capacitive ultrasonic sensor 12 may be amplified at one of the amplifiers 43, filtered at one of the filters 44 and then multiplexed at the multiplexer 45 into a serial stream. In one example according to the present invention, the MCU 41 may control the multiplexer 45 to receive an output from one of the filters 44 and multiplex the output into a serial stream. Since the one of the filters 44 corresponds to one of the sensor elements 120, the position of the corresponding sensor element 120 and in turn a 2D location of an input object may be detected.

The serial stream from the multiplexer 45 may be converted into a digital signal at the ADC 46. The digital signal may include information on the position such as a two-dimensional (2D) coordinate of the one sensor element that detects the reflected signal, and a distance between the one sensor element and the input object such as the object 10 illustrated in FIG. 1A. The MCU 41 may store the position of the one sensor element and the distance of the input object from the sensor element in a memory device 47. The MCU 41 may be configured to map the position of the sensor element with a corresponding position on a display panel 11, and may map the distance with a letter or numeral. In one example, the memory device 47 may include a lookup table to facilitate the mapping between a sensor element position and a display panel position and the mapping between a distance related to a sensor element and an alphabetic letter such as A to Z or a digital numeral such as 0 to 9. Based on the corresponding position and distance from the MCU 41, the display driver 48 may activate a corresponding operation such as a click or double click of a cursor or pointer or an input of a letter or numeral on the display panel 50. In another example, the display driver 48 may include a lookup table to facilitate the mapping between a display panel position and a sensor element position and the mapping between a distance related to the sensor element and a corresponding operation on the display panel.

Figure 5A:
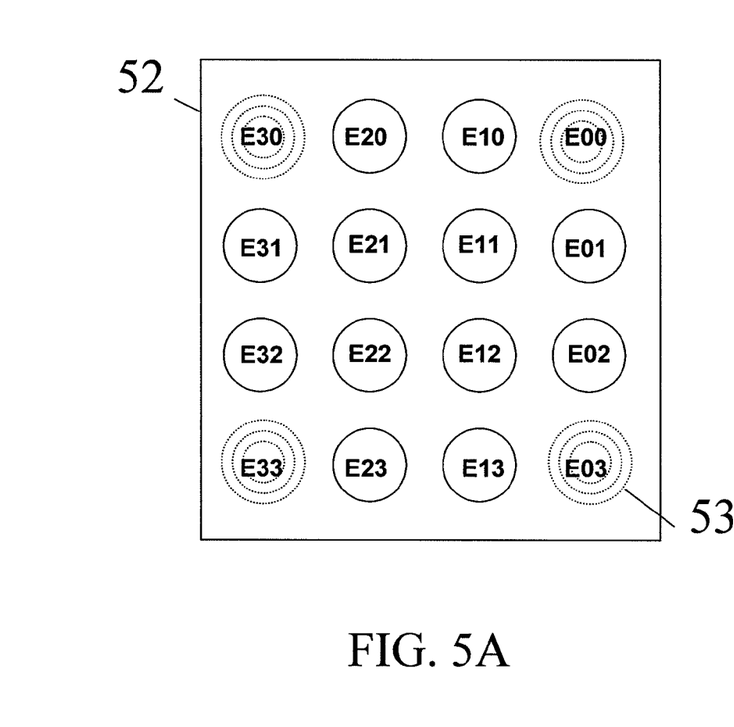
FIG. 5A is a top planar view of a capacitive ultrasonic sensor in accordance with an example of the present invention.

FIG. 5A is a top planar view of a capacitive ultrasonic sensor 52 in accordance with an example of the present invention. Referring to FIG. 5A, the capacitive ultrasonic sensor 52 may include an array of sensor elements with index numbers E00 to E33, which in turn may represent the coordinates of the sensor elements. In one example according to the present invention, a first portion of the sensor elements, for examples, sensor elements E00, E03, E30 and E33 at the corners of the capacitive ultrasonic sensor 52 as illustrated in the present example, may receive a voltage signal from the power source 42 illustrated in FIG. 4 and transmit ultrasonic waves 53 (shown in dotted circles). A second portion of the sensor elements, in the example, sensor elements E01, E02, E31, E32, E10 to E13 and E20 to E23, may not be activated until at least one of the first portion of sensor elements E00, E03, E30 and E33 detects a reflected signal. In other examples, however, all of the sensor elements E00 to E33 may be activated when the voltage signal is provided.

Figure 5B:
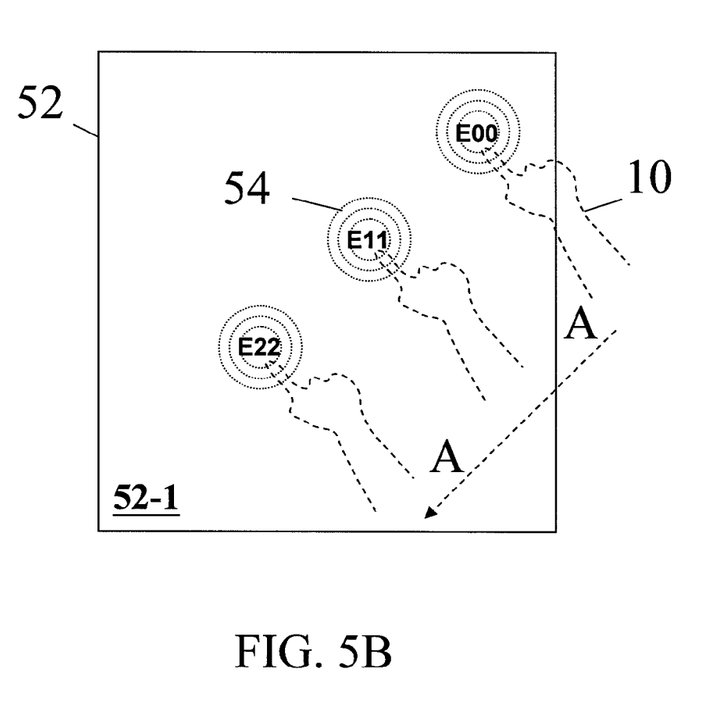
FIG. 5B is a schematic diagram illustrating the capacitive ultrasonic sensor illustrated in FIG. 5A in operation.

FIG. 5B is a schematic diagram illustrating the capacitive ultrasonic sensor 52 illustrated in FIG. 5A in operation. Referring to FIG. 5B, the object 10 may move over the capacitive ultrasonic sensor 52 across a surface 52-1 thereof along a direction AA. The sensor elements E00, E11 and E22 may detect reflected signals from the object 10. The positions or coordinates of the sensor elements E00, E11 and E22 may be stored in the memory device 47 with action descriptions, as given in TABLE 1 below.

TABLE 1

| action descriptions | sensor elements | | |
| --- | --- | --- | --- |
| | E00 | E11 | E22 |
| START | X | | |
| TRANSIT | | X | |
| END | | | X |

Referring to TABLE 1, the MCU 41 may identify that the movement of the object 10 across the surface 52-1 may start from the sensor element E00 through sensor element E11 to sensor element E22. The MCU 41 may then identify whether the voltage level of each of the reflected signals detected by the sensor elements E00, E11 and E22 is greater than or equal to the threshold Vt for a first predetermined period, for example, "N" times of the detection cycle, each of the N detection cycles including the first period from $T_P$ to $T_S$ and the second period $T_A$, N being greater than or equal to one (1). The first predetermined period may be long enough to ensure that a reflected signal as detected does not result from an unwanted operation or malfunction of an input object. That is, during the N detection cycles, a number of N reflected signals may be received by the same one of the sensor elements E00, E11 and E22. If the number of reflected signals is less than N or if the voltage level of one of the N reflected signals is not greater than or equal to the threshold Vt for the first predetermined period, the position of a corresponding one of the sensor elements E00, E11 and E22 may be removed from the memory device 47. If a number of N reflected signals are received and the voltage level of each of the N reflected signals is greater than or equal to the threshold Vt for the first predetermined period, the position of a corresponding one of the sensor elements E00, E11 and E22 may be mapped to a position or coordinate of a display panel. In the present example, the movement of the object 10 from E00 through E11 to E22 may cause a corresponding movement of a cursor across the display panel.

Furthermore, if the object 10 stays at the position E22 for a second predetermined period, for example, "M" detection cycles, M being an integer, and a number of "M" reflected signals are received each having a voltage level greater than or equal to the threshold Vt in the M detection cycles, which may mean that a click, double click or other suitable action is performed over the position E22, the distance of the object 10 from the sensor element E22 may be stored in the memory device 47 and mapped to a corresponding action on the display panel. Accordingly, based on the position and distance, the display driver 48 may activate a cursor or pointer of the display panel so as to, for example, move across the display panel or perform a corresponding operation on the display panel.

Figure 6:
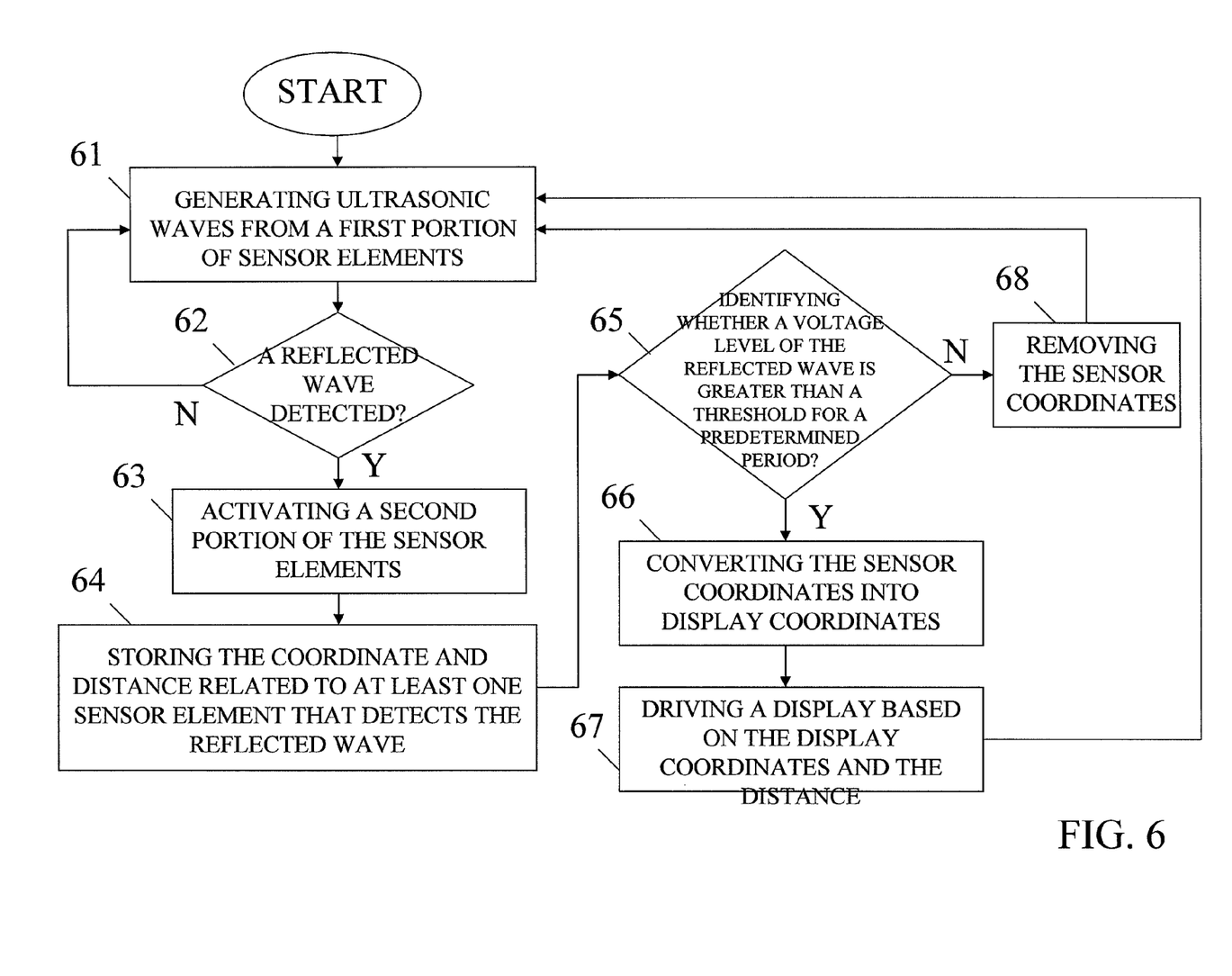
FIG. 6 is a flow diagram illustrating a method of operating a capacitive ultrasonic sensor in accordance with an example of the present invention.

FIG. 6 is a flow diagram illustrating a method of operating a capacitive ultrasonic sensor in accordance with an example of the present invention. Referring to FIG. 6, at step 61, a first portion of sensor elements may generate ultrasonic waves based on a voltage signal from a power source. It may be identified at step 62 whether a reflected signal is detected by one of the first portion of sensor elements. If none of the first portion of sensor elements detects a reflected signal, the step 61 may be repeated. If at least one of the first portion of sensor elements detects a reflected signal with a voltage level greater than a threshold Vt, a second portion of the sensor elements may then be activated at step 63. Activating the sensor elements in two or more steps at different time may achieve an efficient use of power. In one example, however, the first portion of sensor elements may include all of the sensor elements. In that case, the step 63 may be skipped.

Next, at step 64, the position or coordinate of and the distance related to each of the first and second portions of sensor elements that detects a reflected signal may be stored, for example, in a memory device. At step 65, it may be identified whether the voltage level of the each of sensor elements is greater than the threshold Vt for a predetermined period. If not, at step 68, the position of and the distance related to the each of sensor elements may be removed from the memory device. If confirmative, at step 66, the position or coordinate of the each of the sensor elements may be mapped to a corresponding position or coordinate of a display panel, and the distance related to the each of the sensor elements may be mapped to a letter, numeral or other suitable action of a cursor. A display driver may then activate a cursor or a pointer based on the corresponding position or coordinate and/or a corresponding letter, numeral or action at step 67. The step 61 may be repeated after the steps 67 and 68 subsequently.

In describing representative examples of the present invention, the specification may have presented the method and/or process of operating the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A capacitive ultrasonic device configured to detect of detecting an object and providing information regarding an orientation of the object, the capacitive ultrasonic device comprising:

a power source configured to generate a voltage signal;

an array of sensor elements, each of the sensor elements being configured to generate an ultrasonic wave during a first period of the voltage signal and detect whether a wave is reflected from the object during a second period of the voltage signal when the voltage signal is applied thereto; and a control unit configured to activate a first portion of the array of sensor elements through the power source, and activate a second portion of the array of sensor elements when at least one of the first portion of the sensor elements detects a wave reflected from the object.

2. The capacitive ultrasonic device of claim 1, wherein the voltage signal includes an alternating-current (AC) component and a direct-current (DC) component during the first period, and includes the DC component during the second period.

3. The capacitive ultrasonic device of claim 1, wherein the control unit identifies whether the magnitude of a wave reflected from the object is greater than or equal to a threshold.

4. The capacitive ultrasonic device of claim 1, wherein the control unit identifies whether the magnitude of a wave reflected from the object is greater than or equal to a threshold for a predetermined period.

5. The capacitive ultrasonic device of claim 1, wherein the control unit is configured to identify a position of each of the first portion of the sensor elements and a distance between the each of the first portion of the sensor elements and the object if the each of the first portion of the sensor elements detects a wave reflected from the object.

6. The capacitive ultrasonic device of claim 5 further comprising a memory configured to store the position and distance related to the each of the first portion of the sensor elements.

7. The capacitive ultrasonic device of claim 5, wherein the control unit is coupled to a display driver and provides information regarding the position and distance related to the each of the first portion of the sensor elements to the display driver.

8. The capacitive ultrasonic device of claim 2, wherein the control unit is configured to change the magnitude of a DC component of the voltage signal.

9. A capacitive ultrasonic device configured to detect of detecting an object and providing information regarding an orientation of the object, the capacitive ultrasonic device comprising:

a power source configured to generate a voltage signal including a direct-current (DC) component;

an array of sensor elements coupled to the power source, each of the sensor elements being configured to generate an ultrasonic wave with an effective distance when the voltage signal is applied thereto; and a control unit configured to activate at least one of the array of sensor elements through the power source, and change the effective distance of the ultrasonic wave by changing the magnitude of the DC component of the voltage signal.

10. The capacitive ultrasonic device of claim 9, wherein the control unit is configured to identify a position of each of the at least one of the sensor elements and a distance between the each of the at least one of the sensor elements and the object if the each of the at least one of the sensor elements detects a wave reflected from the object.

11. The capacitive ultrasonic device of claim 9, wherein each of the sensor elements is configured to generate an ultrasonic wave during a first period of the voltage signal and detect whether a wave is reflected from the object during a second period of the voltage signal when the voltage signal is applied thereto.

12. The capacitive ultrasonic device of claim 11, wherein the voltage signal includes an alternating-current (AC) component and the DC component during the first period, and includes the DC component during the second period.

13. The capacitive ultrasonic device of claim 9, wherein the control unit is configured to identify whether the magnitude of a wave reflected from the object is greater than or equal to a threshold.

14. The capacitive ultrasonic device of claim 9, wherein the control unit is configured to identify whether the magnitude of a wave reflected from the object is greater than or equal to a threshold for a predetermined period.

15. The capacitive ultrasonic device of claim 10 further comprising a memory configured to store the position and distance related to the each of the at least one of the sensor elements.

16. The capacitive ultrasonic device of claim 9, wherein the control unit is configured to activate at least another one of the sensor elements when the at least one of the sensor elements detects a wave reflected from the object.

17. A capacitive ultrasonic device configured to detect of detecting an object and providing information regarding an orientation of the object, the capacitive ultrasonic device comprising:

a power source configured to generate a voltage signal including a direct-current (DC) component;

a capacitive ultrasonic sensor coupled to the power source, the capacitive ultrasonic sensor including an array of sensor elements each of which is configured to generate an ultrasonic wave with an effective distance when the voltage signal is applied thereto; and a control unit configured to identify a position of each of the sensor elements and a distance between the each of the sensor elements and the object if the each of the sensor elements detects a wave reflected from the object.

18. The capacitive ultrasonic device of claim 17, wherein the voltage signal includes an alternating-current (AC) component and the DC component during a first period, and includes the DC component during a second period.

19. The capacitive ultrasonic device of claim 18, wherein each of the sensor elements is configured to generate an ultrasonic wave during the first period of the voltage signal and detect whether a wave is reflected from the object during the second period of the voltage signal when the voltage signal is applied thereto.

20. The capacitive ultrasonic device of claim 17, wherein the control unit identifies whether the magnitude of a wave reflected from the object is greater than or equal to a threshold.

21. The capacitive ultrasonic device of claim 17, wherein the control unit identifies whether the magnitude of a wave reflected from the object is greater than or equal to a threshold for a predetermined period.

22. The capacitive ultrasonic device of claim 17 further comprising a memory configured to store the position and distance related to the each of the sensor elements.

23. The capacitive ultrasonic device of claim 17, wherein the control unit is configured to activate a portion of the array of sensor elements after at least one of the sensor elements detects a wave reflected from the object.

24. The capacitive ultrasonic device of claim 17, wherein the control unit is configured to change the effective distance of the ultrasonic wave by changing the magnitude of the DC component of the voltage signal.

25. The capacitive ultrasonic device of claim 10, wherein the control unit is coupled to a display driver and sends to the display driver information on the position of the each of the at least one of the sensor elements and the distance between the each of the at least one of the sensor elements and the object.

26. The capacitive ultrasonic device of claim 17, wherein the control unit is coupled to a display driver and sends to the display driver information on the position of the each of the at least one of the sensor elements and the distance between the each of the at least one of the sensor elements and the object.

* * * * *